(12) United States Patent
Musabeyoglu et al.

(10) Patent No.: US 10,089,801 B1
(45) Date of Patent: Oct. 2, 2018

(54) UNIVERSAL ACCESS CONTROL DEVICE

(71) Applicant: Amazon Technologies, Inc., Seattle, WA (US)

(72) Inventors: Ahmet Musabeyoglu, Sunnyvale, CA (US); Balarajan Balasubramaniam, San Jose, CA (US); William Greger, San Francisco, CA (US); Carl Haverl, Aptos, CA (US); Prakash Krishnamurthy, Sammamish, WA (US); Kaushik Mani, Seattle, WA (US); Peeyush Champalal Nahar, Sammamish, WA (US); Hoshgeldy Tachmuradov, Soquel, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/595,840

(22) Filed: May 15, 2017

(51) Int. Cl.
*G07C 9/00* (2006.01)
*H04L 29/06* (2006.01)
*H04W 4/80* (2018.01)

(52) U.S. Cl.
CPC ...... *G07C 9/00007* (2013.01); *H04L 63/0807* (2013.01); *H04W 4/80* (2018.02)

(58) Field of Classification Search
CPC ............ G07C 9/00722; G07C 9/00857; H04L 63/0807; H04W 4/008
See application file for complete search history.

(56) References Cited

U.S. PATENT DOCUMENTS

2017/0039790 A1* 2/2017 Roy .................... H04W 4/008
2017/0124792 A1* 5/2017 Schoenfelder ......... G06F 21/31

OTHER PUBLICATIONS

U.S. Appl. No. 15/714,956, filed Sep. 25, 2017, Titled: Time-Bound Secure Access.
U.S. Appl. No. 15/916,103, filed Mar. 8, 2018, Titled: Integrated Access Control System.

* cited by examiner

*Primary Examiner* — Nabil Syed
(74) *Attorney, Agent, or Firm* — Kilpatrick Townsend & Stockton LLP

(57) ABSTRACT

Described herein is a system and universal access control device that may be installed in proximity to, or within, an access control system to enable a user to use a user device to gain access to a secure area or resource. In some embodiments, a user may submit a request for access to a remote server and may be provided with an access token. The user may relay the received access token to the universal access device via a wireless transmission means on his or her user device. The universal access device may verify the authenticity of the access token by relaying the access token information to the remote server. Once the access token has been authenticated, the universal access control device may retrieve a credential stored in memory and provide that credential to the access control system to enable the user to gain entry to a secure area.

16 Claims, 10 Drawing Sheets

US 10,089,801 B1

UNIVERSAL ACCESS CONTROL DEVICE

BACKGROUND

The term access control refers to the practice of restricting entrance to a secure area or resource to authorized persons. There are a number of access control systems available to restrict access to secure areas and/or resources. Access to each of these secure areas and resources may be gained by presenting an access device appropriate to each access control system.

In some cases, one or more people may need to access a large number of secure areas within a given period of time. For example, delivery personnel may need to make deliveries to a number of secure areas during completion of their delivery route. In this example, a delivery person could leave the deliveries outside of the secure area, but then the recipients of the delivery run the risk of loss due to theft. Alternatively, the delivery person could maintain access devices for each of the secure areas that he or she delivers to. However, this can be bulky, inconvenient, and poses a number of security risks.

Embodiments of the invention address these and other problems, individually and collectively.

BRIEF DESCRIPTION OF THE DRAWINGS

Various embodiments in accordance with the present disclosure will be described with reference to the drawings, in which.

DETAILED DESCRIPTION

Figure 1:
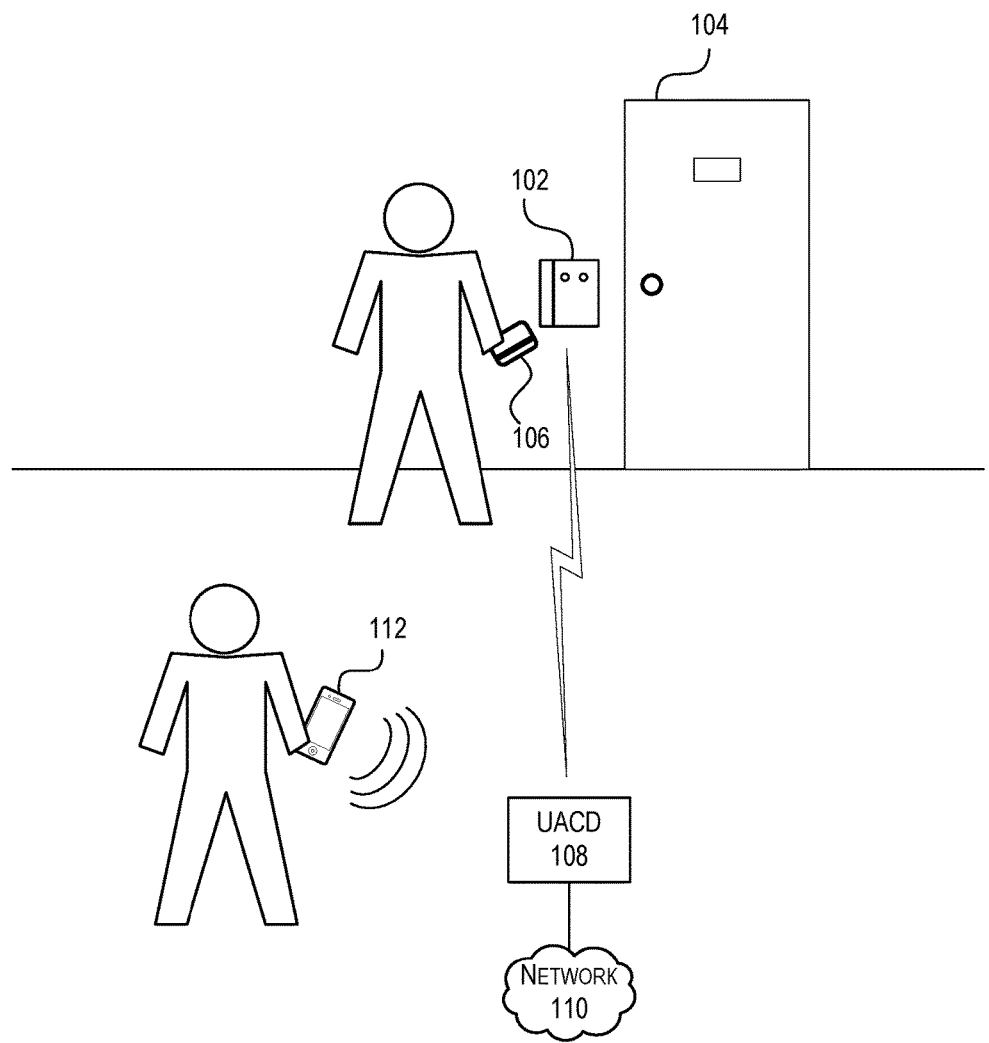
FIG. 1 depicts an illustrative example of a universal access control system that may be implemented in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include a system and universal access control device (UACD) configured to be used in conjunction with access control systems in order to provide access to secure areas. The universal access control device can be used with access control systems already on the market, regardless of the type of access device used by that access control system. Additionally, access tokens used by the universal access control device may be managed by a remote server (e.g., using a cloud computing environment).

In some embodiments, the universal access control device may be installed in proximity to a reader device of the access control system. In these embodiments, the reader device may be configured to receive wireless transmission of credentials from an access device. The universal access control device may be programmed with credential information appropriate for the access control system. For example, the universal access control device may contain a pre-authorized credential which will be activated when a valid access request is received. When a user needs to gain access to the access control point managed by the access control system, that user might submit a request for an access token to a remote server. The remote server may provide the requested access token to a user device associated with the user. The user is then able to use his or her user device to communicate the access token to the universal access control device. The universal access control device validates the provided access token. Once validated, the universal access control device retrieves the credential stored in memory and transmits it to the reader device in order to enable the user to gain entry.

In some embodiments, the universal access control device may be installed between a reader device of the access control system and an access control board of the access control system. In some case, the universal access control device may comprise multiple devices. For example, the universal access control device may include a splitter device in communication with a remote server via a network connection. This example universal access control device may also include a receiver device located remote from the splitter device which is also able to communicate with the remote server via a network connection. The universal access control device may receive a credential from a reader device when a user presents his or her access device to gain entry (e.g., via the splitter device). The universal access control device may include in its memory computer-executable instructions that may cause the universal access control device to relay the received credential to an access control board. Upon the access control board determining that the credential is valid (by referencing a control list maintained either locally or remotely), the access control board may provide an indication to the universal access control device that the credential is valid (e.g., the access control board may send a signal to light up an indicator or a signal to a relay switch to open a door). Upon receiving that indication, the universal access control device may store the received credential in memory to be used later. The universal access control device may store a number of credentials in this manner. For example, the universal access control device may store the last X credentials presented by users having a valid access device, where X is some predetermined number. In some embodiments, the universal access control device may be configured to cycle through the X credentials that it provides to an access control system. When a user needs to gain access to the access control point managed by the access control system, that user might submit a request for an access token to a remote server. The remote server may provide the requested access token to a user device associated with the user. The user is then able to use his or her user device to communicate the access token to the universal access control device (e.g., via a Bluetooth® receiver). The universal access control device validates the provided access token (e.g., by sending it to the remote server for validation). Once validated, the universal access control device retrieves the credential stored in memory and provides it to the access control board in order to enable the user to gain entry. It should be noted that some embodiments of the universal access control device may not include a receiver device. For example, the system may use geo-fencing to detect when the user enters a proximity of an access control reader. In this example, an access request may be submitted automatically upon detecting that the user is approaching the access control point.

By way of a first illustrative example, consider a scenario in which a user wishes to gain entry to a parking garage secured using the universal access control device described herein. For the purposes of this illustrative example, assume that the user is making a delivery to the building in which the garage is located. In this example, the user may use her mobile phone to communicate with a remote server that provides backend support for the universal access control device to request an access token. In this example, the remote server may have access to the user's delivery schedule and may determine that the user does have a delivery that requires access to the garage. The remote server may then send an access token to the user's mobile phone. Upon arriving at the garage, the user's mobile device may detect the universal access control device using a wireless receiver (e.g., a wireless receiver in accordance with the Bluetooth® series of wireless communication standards) through a discovery process. In this scenario, the universal access control device may be located proximate to a wireless receiver used in an automated garage-door opening system. The universal access control device may also be pre-programmed with a credential that may be used with the garage door (e.g., the universal access control device may be programmed in a manner similar to a garage door opener keyfob typically used with an automated garage-door opening system). In this example, the user may send the access token to the universal access control device via a wireless signal. The universal access control device may then communicate with the remote server to determine whether the access token is valid. Upon determining that the access token is valid, the universal access control device may be configured to transmit the stored credential to the wireless receiver used in the automated garage-door opening system to cause it to open the garage door. The user is then able to enter the garage and make her delivery.

By way of a second illustrative example, consider a scenario in which a user wishes to gain entry to an area secured using the universal access control device under specific conditions. For example, a user may log into a vacation rental website operated by a remote server in order to rent a home for a period of time. In some embodiments, the user may provide his or her mobile phone number upon making a reservation. The remote server, upon verifying the reservation, may generate an access token that can be used to access the home for the specified time period. The access token may then be sent to the user's mobile phone (e.g., at the provided mobile number). When the user approaches the home during the specified period of time, the user may use his or her mobile phone to unlock the home via a universal access control device installed in conjunction with the access control system of the home.

FIG. 1 depicts an illustrative example of a universal access control system that may be implemented in accordance with at least some embodiments. In an access control system, an access control reader 102 may be used to control access to an access control point 104. The access control reader 102 may be configured to respond to an access device 106. In FIG. 1, embodiments of the disclosure may include a universal access control device UACD 108 which is in communication with the access control system (e.g., via the access control reader 102) and/or a network 110. The universal access control device 108 may be configured to receive a wireless communication from a user device 112 and cause the access control system to allow access to the access control point 104.

In some embodiments, access control reader 102 may be any suitable electronic device capable of receiving a credential and either granting or denying access to an access control point 104 based on the received credential. When a credential is presented to an access control reader 102 (e.g., via an access device 106), the access control reader 102 sends information indicating the credential to a processor device of the access control system. The processor device compares the credential to entries within an access control list, grants or denies the presented request based on that comparison, and sends a transaction log to a database. If access is denied based on the access control list, the access control point 104 remains inaccessible. If there is a match between the credential and an entry on the access control list, the processor device operates a relay that in turn grants access to the access control point 104. In some embodiments, the processor device may also ignore a door open signal, which prevents an alarm from sounding. In some embodiments, the access control reader 102 may provide feedback to a user, such as displaying a flashing red light-emitting diode (LED) when access has been denied and a flashing green LED when access has been granted. In some non-limiting examples, an access control reader 102 could be a keypad into which a code is entered a card reader, a keyfob receiver, a radio frequency identifier (RFID) reader, or a biometric reader.

In some embodiments, access control point 104 may be any suitable barrier for which access may be controlled. In some embodiments, an access control point 104 may be a physical facility or a computer-based information system. In some embodiments, an access control point 104 may be a door, turnstile, parking gate, elevator, or other physical barrier, where granting access can be electronically controlled. The access control point 104 may include an electronic lock which is operated by the access control system. In some embodiments, an access control point 104 may also include a sensor to detect when the access control point 104 has been accessed inappropriately and trigger an alarm.

In some embodiments, access device 106 may be any suitable physical/tangible object, a piece of knowledge, or a facet of a user's physical being that enables an individual access to a given access control point 104. In some embodiments, an access device 106 may be something a person knows (such as a number or PIN), something they have (such as an access badge), something they are (such as a biometric feature), or some combination of these. An access device 106 may be configured to relay a credential to an access control reader 102.

A credential may be any identifier associated with an access device 106 and/or account. For example, a credential may be an account identifier or an identifier of the access device 106 which is associated with an account. For example, in the event that an access device 106 is a keyfob, the keyfob may be given a serial number or other identifier by its manufacturer. The keyfob, when communicating with the access control reader 102, may be configured to provide that identifier to the access control reader 102. In this example, the keyfob may be assigned to a user's account. The keyfob's identifier may then act as a credential to access any area which the user is authorized to access.

In some embodiments, universal access control device 108 is an electronic device capable of receiving an access request from a user device 112 and causing the access control system to grant access to the access control point 104. In some embodiments, the universal access control device 108 may be installed between the access control reader 102 and an access control board in the access control system. In at least some of these embodiments, the universal access control device 108 may include at least a splitter device and a receiver device. In some embodiments, the universal access control device 108 may be separate from the access control system. For example, in embodiments in which the access control reader 102 includes a wireless communication receiver, the universal access control device 108 may include at least a receiver device and a transmitter device. In this example, the universal access control device 108 may receive a signal from a user device 112, determine whether access should be granted to an operator of the user device 112, and transmit a signal to the access control reader 102 to cause it to grant access to the operator of the user device 112. Each of these embodiments will be described in greater detail below.

In some embodiments, network 110 may include any one or a combination of many different types of networks, such as cable networks, the Internet, wireless networks, cellular networks, and other private and/or public networks. Additionally, the network 110 may represent communications transmitted over a landline phone, via a kiosk, or in any other suitable manner.

In some embodiments, user device 112 may be any suitable type of computing device such as, but not limited to, a mobile phone, a smart phone, a personal digital assistant (PDA), a laptop computer, a desktop computer, a server computer, a thin-client device, a tablet PC, etc. Additionally, a user device 112 may be any type of wearable technology device, such as a watch, earpiece, glasses, etc. The user device 112 may include one or more processors capable of processing user input. Additionally, the user device 112 may be configured to communicate with the universal access control device 108 via a wireless communication means (e.g., via Bluetooth®). In some embodiments, the user device 112 may have installed upon it a mobile application (i.e., a set of computer-executable instructions) that enables communication with the universal access control device 108.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
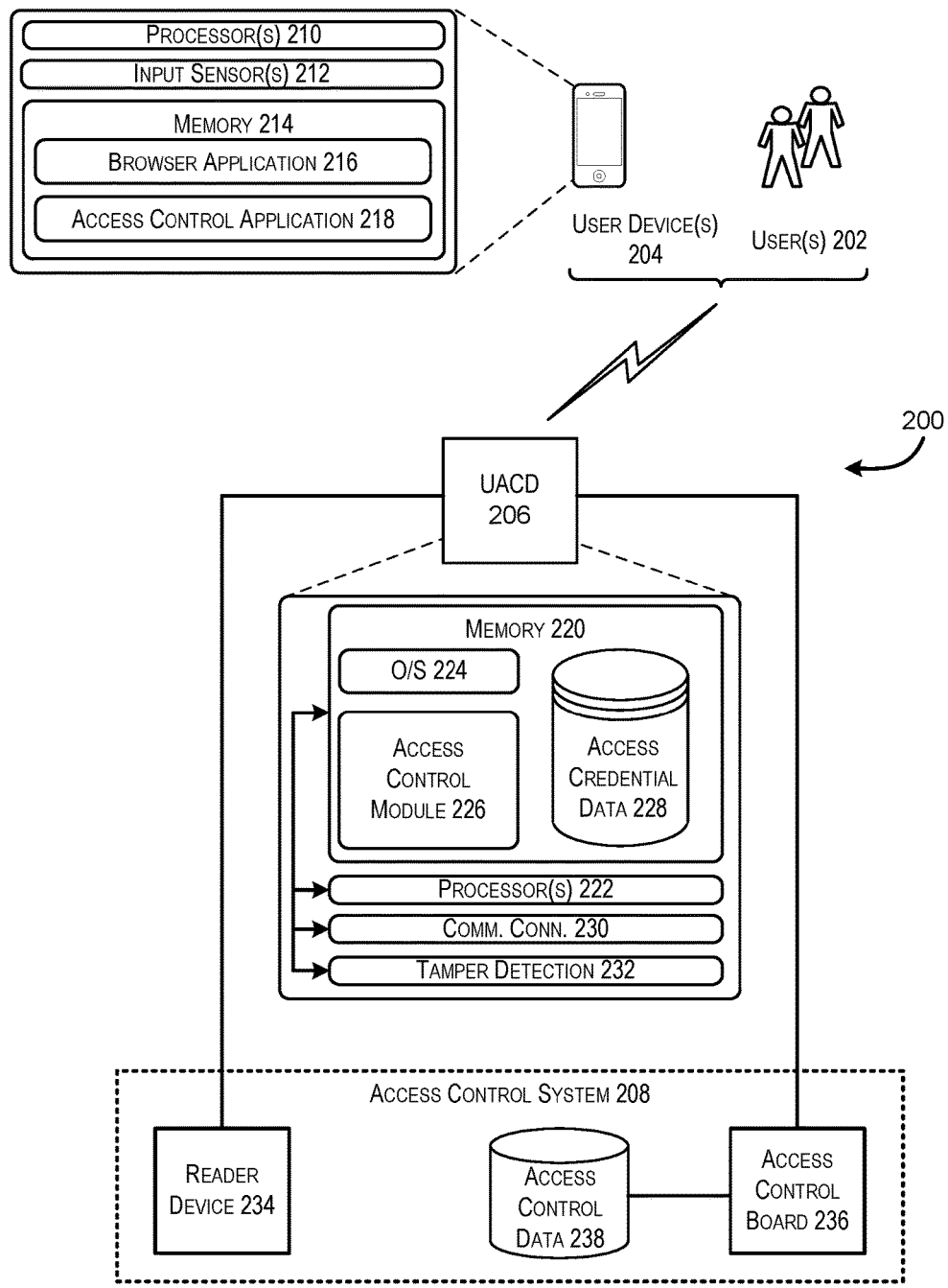
FIG. 2 depicts an illustrative example of a system or architecture 200 for a universal access control device that may be implemented in accordance with at least some embodiments.

FIG. 2 depicts an illustrative example of a system or architecture 200 for a universal access control device that may be implemented in accordance with at least some embodiments. In architecture 200, one or more consumers and/or users 202 may utilize user devices 204. In some examples, the user device 204 may be in communication with a universal access control device UACD 206 via a wireless communication means. The universal access control device 206 may be in communication with an access control system 208.

As described above, the user devices 204 may be any type of computing device such as, but not limited to, a mobile phone, a smart phone, a personal digital assistant (PDA), a laptop computer, a desktop computer, a server computer, a thin-client device, a tablet PC, etc. Additionally, user devices 204 may be any type of wearable technology device, such as a watch, earpiece, glasses, etc. The user device 204 may include one or more processors 210 capable of processing user input. The user device 204 may also include one or more input sensors 212 for receiving user input and/or conditions associated with the user device 204. As is known in the art, there are a variety of input sensors 212 capable of detecting user input, such as accelerometers, cameras, microphones, etc. The user input obtained by the input sensors may be from a variety of data input types, including, but not limited to, audio data, visual data, or biometric data. Embodiments of the application on the user device 204 may be stored and executed from its memory 214.

Turning to the contents of the memory 214 in more detail, the memory 214 may include a browser application 216. The memory 214 may also include an access control application 218 that is capable of communicating access credentials to the universal access control device. Although sample architecture 200 depicts an access control application 218 as being included in the contents of the memory 214 of the user device 204, some embodiments may not include an access control application 218 in memory 214 of the user device 204.

In some embodiments, the access control application 218 may be configured to cause the user device 204 to provide access credentials to a universal access control device 206. In some embodiments, the access control application 218 may be in communication with one or more remote servers that provide backend support for the access control application. The one or more remote servers may be configured to determine which access control points a user device 204 is authorized to gain access to and provide a credential to be used in gaining access. For example, the remote server may determine that the user is to make a delivery to a secure location. Upon making that determination, the remote server may generate a one-time credential that may be used to gain access to the secure location. The remote server may then transmit the credential to the access control application 218 on the user device 204.

As described briefly above, the browser application 216 may allow the users 202 to interact with one or more remote servers, such as to store, access, and/or manage data, develop and/or deploy computer applications, and/or interact with web content. In some embodiments, at least some of the one or more remote servers, perhaps arranged in a cluster of servers or as a server farm, may be configured provide access credentials to a user device 204 via the browser application 216 or via the access control application 218. Although depicted in memory of the user device 204 in this example, in some embodiments the browser application 216 may be hosted at a server. For example, the user device 204 may be a thin client device capable of accessing a browser application 216 remotely. The browser application 216 may be capable of handling requests from many users 202 and serving, in response, various user interfaces that can be rendered at the user device 204 such as, but not limited to, a web site. The browser application 216 may be any type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application 216, such as with other applications running on the user device 204.

The universal access control device 206 may be any type of electronic device configured to interact with an access control system 208 in the manner described. In some embodiments, the universal access control device 206 may be a computing device configured to receive information from user device 204, determine whether a user 202 should be granted access to an access control point, and transmit a valid credential to the access control system 208 upon determining that the user is authorized to access the access control point. Additionally, it should be noted that in some embodiments, at least a portion of functionality described in relation to the universal access control device 206 may be executed remotely. For example, some of the functionality described may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the universal access control device 206 may include at least one memory 220 and one or more processing units (or processors) 222. The processors 222 may be implemented as appropriate in hardware, computer-executable instructions, firmware or combinations thereof. Computer-executable instruction or firmware implementations of the processors 222 may include computer-executable or machine executable instructions written in any suitable programming language to perform the various functions described.

The memory 220 may store program instructions that are loadable and executable on the processors 222, as well as data generated during the execution of these programs. Depending on the configuration and type of universal access control device 206, the memory 220 may be volatile (such as random access memory (RAM)) and/or non-volatile (such as read-only memory (ROM), flash memory, etc.). The universal access control device 206 may also include additional storage, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM. Turning to the contents of the memory 220 in more detail, the memory 220 may include an operating system 224 and one or more application programs or services for implementing the features disclosed herein including at least a module for causing an access control system to unlock an access control point (access control module 226). The memory 220 may also include access credential data 228, which contains an access credential that can be used to gain access to an access control point. In some embodiments, the access credential data 228 may be stored in a database.

The memory 220 and the additional storage 224, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 204 or the universal access control device 206. The universal access control device 206 may also contain communications connection(s) 230 that allow the universal access control device 206 to communicate with a stored database, another computing device or server, user terminals, and/or other devices (e.g., the user device 204 and/or the access control system 208). For example, the communication connections 230 may include a wireless receiver (e.g., a Bluetooth® receiver).

Turning to the contents of the memory 220 in more detail, the memory 220 may include an operating system 226, a database containing access credential data 228 and the one or more application programs or services for implementing the features disclosed herein, including an access control module 226.

In some embodiments, the access control module 226 may be configured to record an access credential into the access credential data 228. For example, the universal access control device 206 may be installed between a reader device 234 and an access control board 236 within an access control system 208. When the reader device 234 receives an access credential, it may relay that access credential to the access control board 236 via the universal access control device 206. In addition, the universal access control device 206 may record the access credential by overriding an access credential stored in access credential data 228. In some embodiments, the access credential data 228 may be overwritten with the newly-received access credential only if the access control board 236 sends a signal to the reader device 234 to indicate that access has been granted. The access control module 226 may also be configured to receive an access token from the user device 204 and determine whether an operator of the user device 204 should be granted access to an access control point. To do this, the access control module 226 may transmit the access token to a remote server to be validated. Upon receiving a response that indicates that the user is authorized to access the access control point, the access control module 226 may be configured to retrieve an access credential stored in access credential data 228 and relay it to the access control board 236.

Access credential data 228 may be overwritten with a most-recently-used valid access credential. Each time that a new access credential is presented to the reader device 234 of the access control system 208, an access credential currently stored in the access credential data 228 may be overwritten with the new access credential.

In some embodiments, the universal access control device 206 may include a tamper detection mechanism 232 configured to detect any unauthorized access to the universal access control device 206. If the tamper detector 232 detects that the universal access control device 206 has been opened inappropriately (e.g., pried open or opened without initiating a clearance procedure), then the tamper detector 232 may be configured to wipe out or destroy the data store containing the access credential data 228. For example, the tamper detection mechanism 228 may, upon detecting the unauthorized access to the universal access control device 206, send an electrical signal to the microchip containing the access credential data 228 to cause it to destroy the microchip and/or the information on the microchip.

In some embodiments, the access control system 208 may include a reader device 234 and an access control board 236. The reader device 234 may be an example of the access control reader 102 depicted in FIG. 1. Upon receiving an access credential from an access control mechanism, the reader device 234 may relay the access credential to the universal access control device 206 and subsequently to the access control board 236. The access control board 236 may compare the access credential to entries on a control list stored within access control data 238. In some embodiments, the access control data 238 may be stored locally in the access control system 208. In some embodiments, the access control data 238 may be stored on a remote server in communication with the access control board 236. Upon determining that the access credential is valid (e.g., matches an entry in the access control data 238), the access control board 236 may grant access to an access control point (e.g., cause an electronic lock to open).

Figure 3:
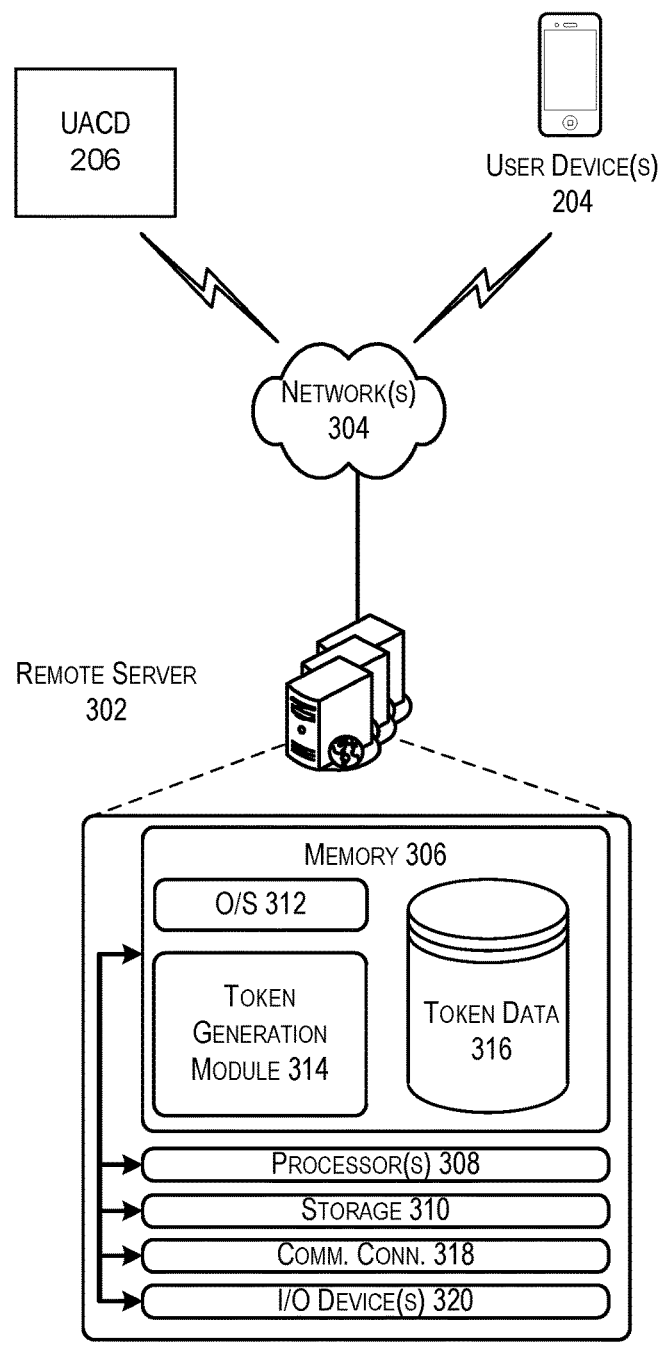
FIG. 3 depicts an illustrative example of a system or architecture 300 for a remote server that provides support for a universal access control device that may be implemented in accordance with at least some embodiments.

FIG. 3 depicts an illustrative example of a system or architecture 300 for a remote server that provides support for a universal access control device that may be implemented in accordance with at least some embodiments. In FIG. 3, a remote server 302 may be in communication with a universal access control device 206 and one or more user devices 204 via a network 304. The network 304 may include any one or a combination of many different types of networks, such as cable networks, the Internet, wireless networks, cellular networks, and other private and/or public networks.

The remote server 302 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the remote server 302 may be executed by one more virtual machines implemented in a hosted computing environment. The hosted computing environment (e.g., a cloud computing environment) may include one or more rapidly provisioned and released computing resources, which computing resources may include computing, networking, and/or storage devices.

In one illustrative configuration, the remote server 302 may include at least one memory 306 and one or more processing units (or processors) 308. The processors 308 may be implemented as appropriate in hardware, computer-executable instructions, firmware or combinations thereof. Computer-executable instruction or firmware implementations of the processors 308 may include computer-executable or machine executable instructions written in any suitable programming language to perform the various functions described.

The memory 306 may store program instructions that are loadable and executable on the processors 308, as well as data generated during the execution of these programs. Depending on the configuration and type of remote server 302, the memory 306 may be volatile (such as random access memory (RAM)) and/or non-volatile (such as read-only memory (ROM), flash memory, etc.). The remote server 302 may also include additional storage 310, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 306 may include multiple different types of memory, such as static random access memory (SRAM), dynamic random access memory (DRAM) or ROM. Turning to the contents of the memory 306 in more detail, the memory 306 may include an operating system 312 and one or more application programs or services for implementing the features disclosed herein including at least a module for determining a level of access to be granted to a user and generating a token to be used to obtain access to an access control point (token module 314). The memory 306 may also include token data 316, which contains tokens used in access control. In some embodiments, the token data 316 may be stored in a database.

The memory 306 and the additional storage 310, both removable and non-removable, are examples of computer-readable storage media. The remote server 302 may also contain communications connection(s) 318 that allow the remote server 302 to communicate with a stored database, another computing device or server, user terminals, and/or other devices on the network(s) 308. The remote server 302 may also include input/output (I/O) device(s) and/or ports 320, such as for enabling connection with a keyboard, a mouse, a pen, a voice input device, a touch input device, a display, speakers, a printer, etc.

Turning to the contents of the memory 306 in more detail, the memory 306 may include an operating system 312, a database containing token data 316 and the one or more application programs or services for implementing the features disclosed herein, including a token module 314. In some embodiments, the token module 314 may be configured to receive requests related to accessing a secure area. For example, a user may submit a request to access a secure area during a particular period of time. The remote server, upon determining that the user should be granted access, may generate or assign a token to be used in granting that access. The token may be stored in token data 316 in relation to one or more use conditions (e.g., a period of time during which the token is valid or a number of uses). The token may then be transmitted to the user device 204. In some embodiments, the token module 314 may be configured to receive a token from the universal access control device 206 and determine whether access should be granted. Upon receiving the token from the universal access control device 206, the token module 314 may compare the access token to the access tokens stored in the token data 316 to determine the validity of the token. Upon determining that the token is valid, the token module 314 may be configured to provide instructions to the universal access control device 206 to grant access to an operator of the user device 204.

An access token may be any suitable string of characters used to map a request to permissions associated with the request. A token may be a string of numbers, letters, or any other suitable characters. The access token may be associated with an expiration date that may be a numeric value (e.g. a 4-digit numeric value). In some embodiments, the token expiry date can be expressed as a time duration as measured from the time of issuance. A token service system used to generate the access token may include or be in communication with a token vault where the generated tokens are stored. Access tokens may be generated in a number of ways. In some embodiments, access tokens may be randomly generated and assigned to each request received by a remote server. In some embodiments, the remote server 302 may, upon receiving a request, identify an access token which is not currently mapped to a request and may map that access token to the request. Upon receiving an access token, the remote server 302 may determine that the access token is valid by querying a token database (e.g., the token vault) in order to determine whether the token is associated with permissions that match conditions of the universal access control device from which the access token has been received. For example, the remote server 302 may determine if the access token is mapped to a request associated with the universal access control device.

Figure 4:
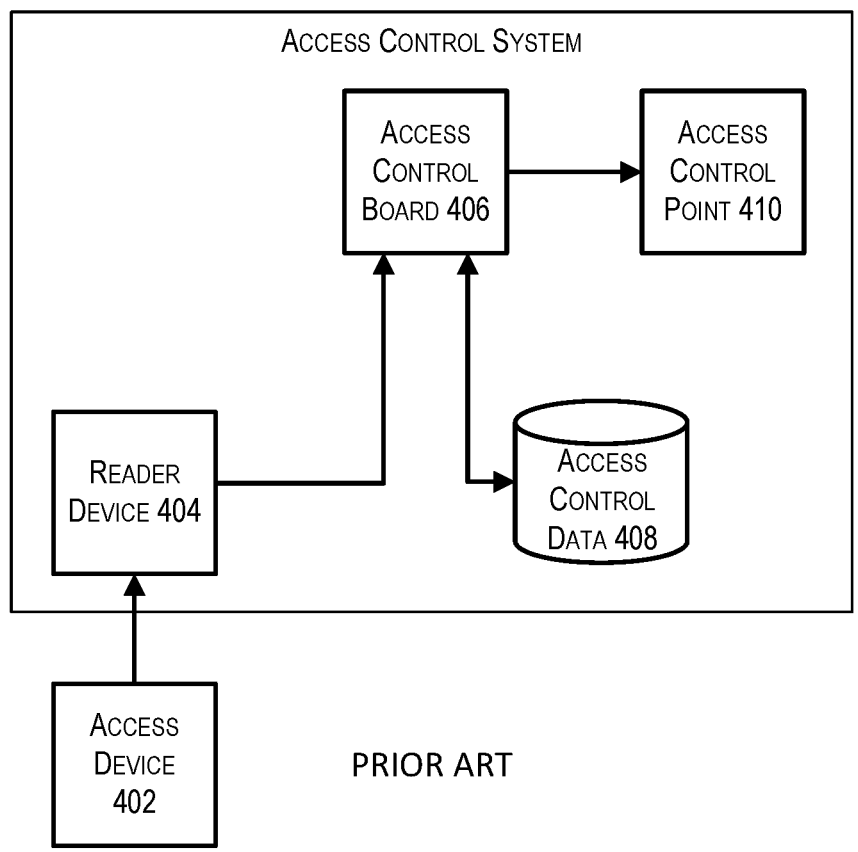
FIG. 4 depicts a prior art access control system that may be implemented to restrict access to a secure area or resource.

FIG. 4 depicts a conventional access control system that may be implemented to restrict access to a secure area or resource. In a conventional access control system, a user may present an access device 402 to a reader device 404. Upon its presentation, the access device 402 provides the reader device 404 with a credential. When the credential is provided to the reader device 402, the reader device 404 sends the received credential information, usually a number or other identifier, to an access control board 406, which includes a processor. A reader device 404 may be in communication with an access control board 406 via any suitable communication mechanism. For example, the reader device 404 may use a Wiegand interface which is commonly used to connect a reader device 404 to the access control board 406.

A Wiegand interface typically uses three wires, one of which is a common ground and two of which are data transmission wires usually called DATA0 and DATA1, alternately labeled "D0" and "D1" or "Data Low" and "Data High." When no data is being sent, both DATA0 and DATA1 are pulled up to the "high" voltage level, which is typically 5 volts direct current (VDC). When a 0 is sent over the Wiegand interface, the DATA0 wire is pulled to a low voltage while the DATA1 wire stays at a high voltage. When a 1 is sent over the Wiegand interface, the DATA1 wire is pulled to a low voltage while DATA0 stays at a high voltage. The high signaling level of 5 VDC may be used to accommodate long cable runs from reader devices to the associated access control board, which is typically located in a secure closet. The communications protocol used on a Wiegand interface is known as the Wiegand protocol. The basic Wiegand format has one parity bit, 8 bits of facility code, 16 bits of ID code, and a trailing parity bit for a total of 26 bits. The first parity bit is calculated from the first 12 bits of the code and the trailing parity bit from the last 12 bits. However, many inconsistent implementations and extensions to the basic format exist. It should be noted that although a Wiegand interface is described, any suitable interface may be used to provide communications between a reader device 404 and an access control board 406 (e.g., RS485, RS232, Ethernet, etc.).

The access control board 406 then compares the credential to those on an access control list within access control data 408 to determine whether access should be granted. The access control board 406 then grants or denies the request for access to the access control point 410. Granting access to the access control point 410 may be done by sending a signal to the access control point 410 to cause an electronic lock to unlock. Additionally, the access control board 406 may send a transaction log to a database. If access to the access control point 410 is denied based on the credential not matching one on the access control list, the access control point 410 remains locked. If there is a match between the credential and an entry on the access control list, the access control board 406 operates a relay that in turn unlocks the access control point 410. The access control board 406 also ignores a door-open signal in order to prevent an alarm from triggering. In some embodiments, the access control board 406 may relay a signal back to the reader device 404 that provides feedback to a user. For example, the reader device 404 may be provided with a signal that causes it to flash a red LED when access is denied and that causes it to flash a green LED when access is granted.

Figure 5:
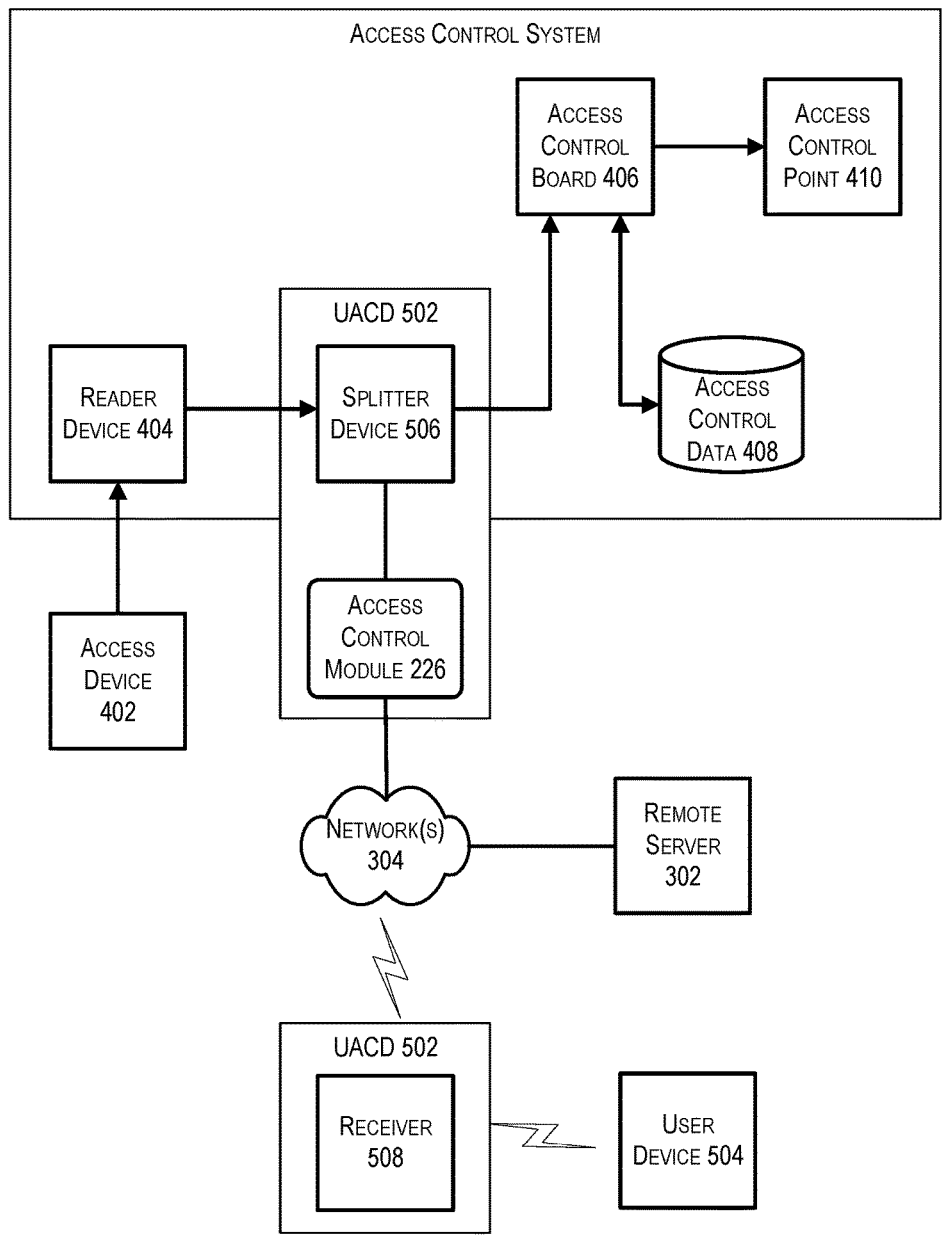
FIG. 5 depicts a first illustrative example of an access control system in which a universal access control device is installed within the system in accordance with at least some embodiments.

FIG. 5 depicts a first illustrative example of an access control system in which a universal access control device is installed within the system in accordance with at least some embodiments. In FIG. 5, a universal access control device 602 may be installed within the access control system (e.g., between the reader device 404 and the access control board 406). The universal access control device 502 may be configured to receive communications from a user device 504 and communicate with a remote server 302 (which may be an example of the remote server 302 depicted in FIG. 3) via a network 304 (which may be an example of the network 304 depicted in FIG. 3).

In some embodiments, the universal access control device 502 may include at least a splitter device 506, a memory with an access control module 226, and a receiver 508 (e.g., a wireless receiver). The splitter device 506 is configured to pass information received from the reader device 404 onto the access control board 406. In addition, the splitter device 506 is configured to, upon the universal access control device 502 determining that a user should be granted access, pass a stored credential to the access control board 406. At least one credential received from the reader device 404 may be stored in memory of the universal access control device 502. In FIG. 5, the universal access control device 502 is depicted as including two separate devices—a splitter device 506 and a receiver device 508. However, it should be noted that in some embodiments the universal access control device may be a single electronic device (e.g., each of the described components may be included within a single housing).

In FIG. 5, a splitter device 506 of the universal access control device 502 may be installed within the access control system between a reader device 404 and the access control board 406. For example, a Wiegand interface connection running from a reader device 404 may be plugged into the universal access control device 502 instead of being plugged into the access control board 406 as originally intended by a manufacturer of the access control system. In this example, a second Wiegand interface connection originating from the universal access control device 502 may be plugged into the access control board 406. In this way, the universal access control device 502 described herein may be used in conjunction with a number of publicly available access control systems in order to provide the described functionality.

In the depicted example, the receiver 508 of the universal access control device 502 may receive an access token from a user device 504. The receiver may be a separate unit from the splitter device 506 and may include a wireless receiver unit in communication with a remote server via network connection 304. Upon receiving an access token from a user device, the receiver 508 communicates that access token to the remote server 302, which will validate the received access token For example, the remote server may access a token vault and match the access token to an account. The token vault may also store an indication as to a period of time over which the token is valid. In another example, the access token may be decrypted by the remote server using a public/private key pair which was used to generate the access token. From the decrypted data, the remote server 302 may identify a user identifier and determine, based on that user identifier, whether access should be granted by the universal access control device. Upon determining whether the access token is valid, the remote server 302 may send a response to the access control module 226 with that indication via a network connection 304. If the access token is valid, then the access control module 226 may retrieve a valid credential stored in memory of the universal access control device 502 and relay that valid credential to the access control board 406 via the splitter device 506. This, in turn, causes the access control board 406 to validate the credential and subsequently grant access to the access control point 410. It should be noted that though FIG. 5 focuses on embodiments in which a stored credential is retrieved from memory and relayed to an access control board 406, in some embodiments, the universal access control device 502 may be in direct communication with an access control point (e.g., an electronic locking mechanism, etc.) and the universal access control device 502 may be configured to cause the access control point to unlock directly (e.g., without providing a credential to the access control board 406).

Figure 6:
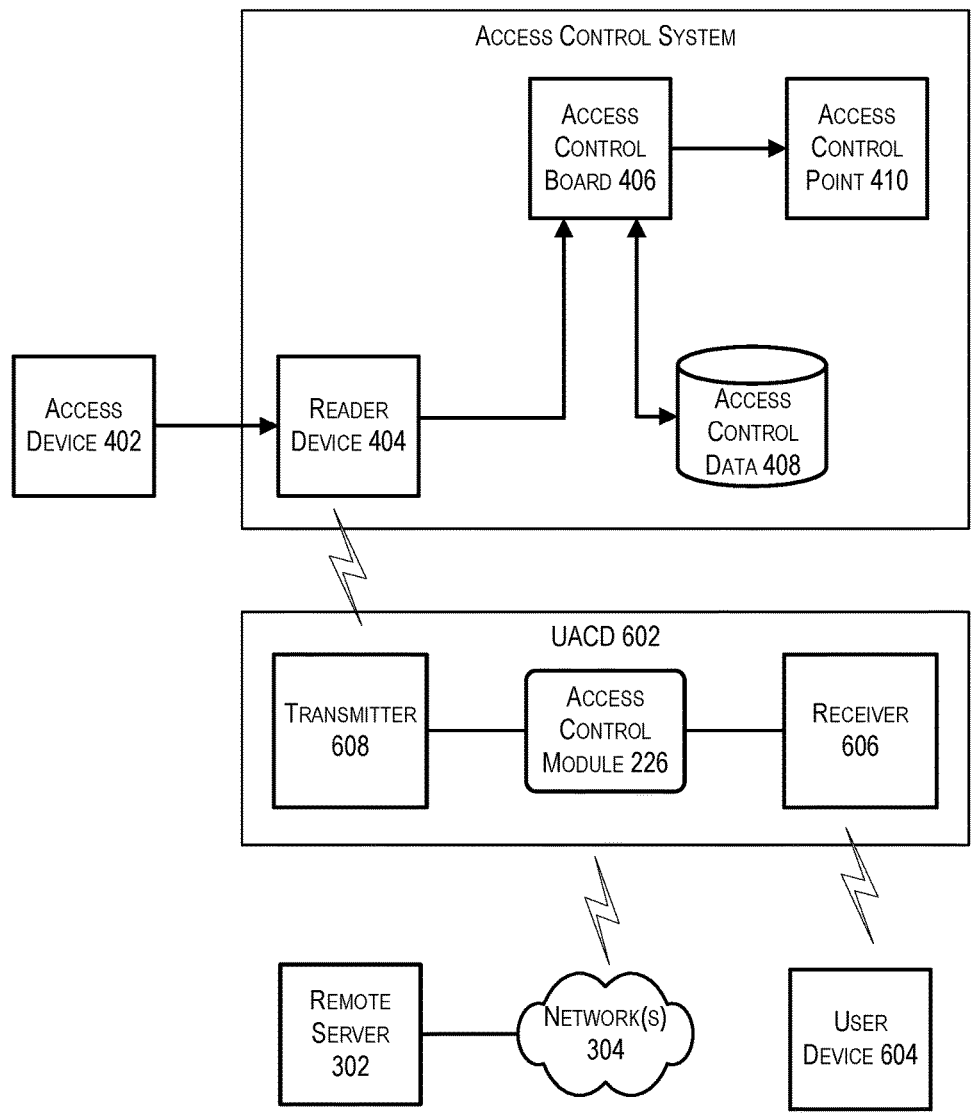
FIG. 6 depicts a second illustrative example of an access control system in which a universal access control device is in communication with the system in accordance with at least some embodiments.

FIG. 6 depicts a second illustrative example of an access control system in which a universal access control device is in communication with the system in accordance with at least some embodiments. In FIG. 5, a universal access control device 602 may be installed within proximity of the access control system (e.g., in communication with the reader device 404). Similar to the example depicted in FIG. 5 above, the universal access control device 602 may be configured to receive communications from a user device 604 and communicate with a remote server 302 (which may be an example of the remote server 302 depicted in FIG. 3) via a network 304 (which may be an example of the network 304 depicted in FIG. 3).

In FIG. 6, the universal access control device 602 may be located in proximity to an access control system in which the reader device 404 of the access control system is a wireless receiver configured to receive a credential wirelessly from an access device 402. For example, the access device 402 may be a remote control device (e.g., a garage door opener) or another suitable wireless transmission device.

In the example depicted in FIG. 6, the universal access control device 602 may include a receiver 606 configured to communicate with a user device 604, a memory with an access control module 226, and a transmitter 608. During a setup process, the universal access control device 602 may be provided with a credential and may be programmed to interact with the access control system. In some embodiments, the universal access control device may be a single unit as depicted. However, in other embodiments, the universal access control device may include multiple units that communicate via a network connection similar to that depicted with respect to FIG. 5.

In the depicted example, the universal access control device 602 may receive an access token from a user device 604 via the receiver 606. The receiver 606 transfers that token to the access control module 226 instantiated in memory of the universal access control device 602. Similar to the example depicted in FIG. 5, in the example depicted in FIG. 6, the access control module 226 may be in communication with a remote server 302. Upon receiving the access token from the user device 604, the access control module 226 relays that access token to the remote server 302, which then determines the validity of the access token. Upon determining whether the access token is valid, the remote server 302 may respond to the access control module 226 with that indication. If the access token is valid, then the access control module 226 may retrieve a valid credential stored in memory of the universal access control device 602 and relay that valid credential to the access control board 406 by transmitting it to the reader device 404 of the access control system.

Figure 7:
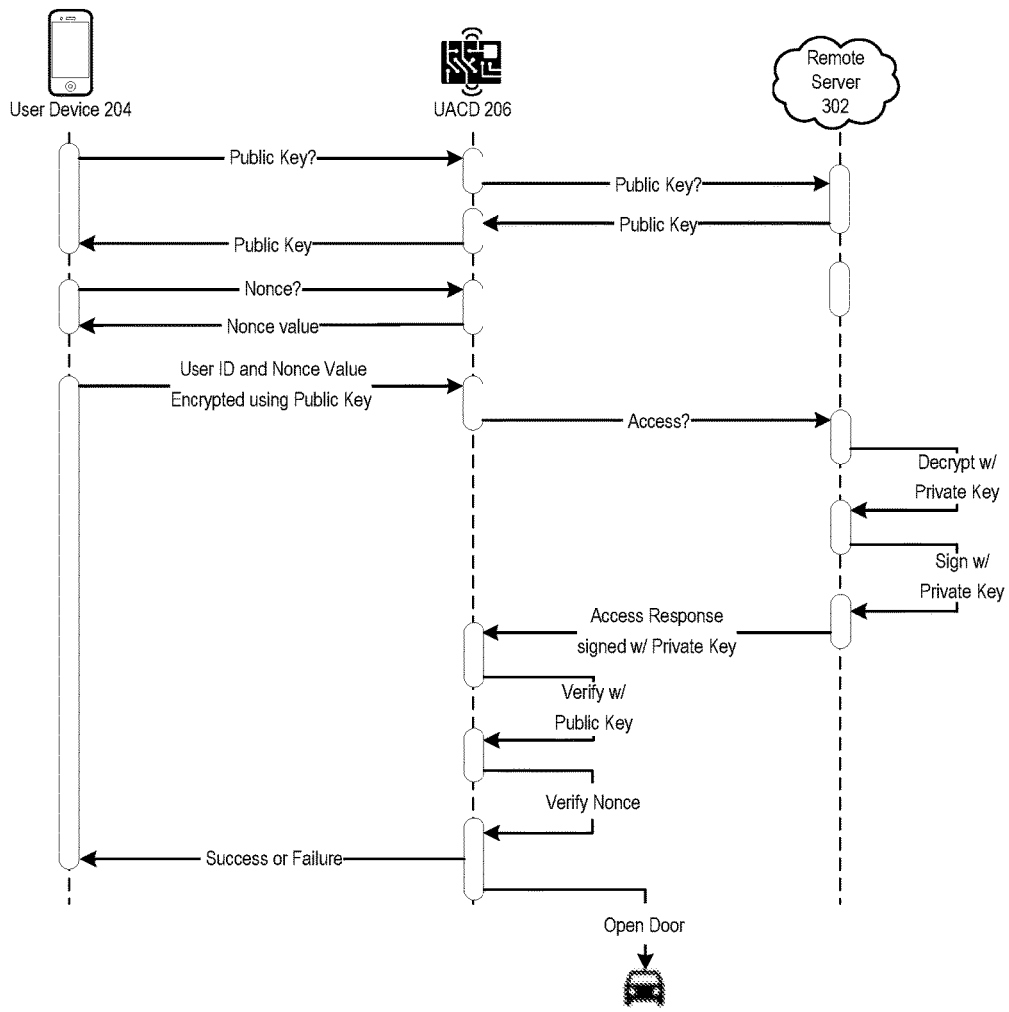
FIG. 7 depicts a sequence diagram showing a data flow in which a user device is provided a secure method of exchanging access token information for use with a universal access control device.

FIG. 7 depicts a sequence diagram showing a data flow in which a user device is provided a secure method of exchanging access token information for use with a universal access control device. Ultimately the access decision is made via a remote server and that decision is returned to the universal access control device. Data exchanged in the manner described may be encrypted end-to-end with a public key associated with the remote server, even in embodiments in which the universal access control device serves as an intermediary.

In data flow 700, a user device 204 (which may be an example of user device 204 depicted in FIG. 2) may submit a request for a public key to the system. In some embodiments, the universal access control device 206 (which may be an example of universal access control device 206 depicted in FIG. 2) may act as an intermediary or proxy by receiving the request and forwarding it to a remote server 302 (which may be an example of remote server 302 depicted in FIG. 3). In some embodiments, the user device 204 may submit the request directly to a remote server 302. The remote server 302 may determine (e.g., based on a user identifier included in the request) whether the user device 204 should be granted access to the system. Upon making this determination, the remote server 302 may provide the user device 204 with a public key from a public/private encryption key pair.

In some embodiments, the user device 204, upon receiving the public key or upon entering a proximity of the universal access control device, may request a nonce value from the universal access control device 206. A nonce value may be any suitable arbitrary value. For example, in some embodiments, the nonce value may be a random number. The universal access control device may respond to the request received from the user device by providing the requested nonce value. In some embodiments, the universal access control device may also transmit the nonce value to the remote server 302.

Upon receiving the nonce value, the user device 204 may generate an access token by encrypting a combination of the nonce value and a user identifier using the public encryption key received from the remote server. The user device may then provide the access token to the universal access control device in order to gain access to a location or resource secured by an access control system in communication with the universal access control device. The universal access control device, as described elsewhere, may then validate the access token. To do this, the universal access control device may transmit the access token to the remote server 302 to determine whether access should be granted.

Upon receiving the access token from the universal access control device, the remote server 302 may decrypt the access token using the private key of the public/private encryption key pair. In some cases, the remote server 302 may strip the nonce value from the decrypted data to obtain the user identifier. The remote server 302 may then determine whether the user identifier included in the access token has authority to access an access control point associated with the universal access control device from which the access request was received. For example, the universal access control device may determine whether the access request is associated with a valid access control list entry and whether the access request meets all required conditions of that access control list entry. Upon making that determination, the remote server 302 may generate an access response, which the remote server may sign using the private key. In some embodiments, the access response may include the nonce value from the access token.

Upon receiving the access response from the remote server 302, the universal access control device 206 may verify the remote server's response using the public key of the public/private encryption key pair. In some embodiments, the universal access control device 206 may also verify the nonce value in the access response. If the remote server has indicated that the user device 204 should be granted access, then the universal access control device may provide an indication of success or failure to the user device 204 upon verifying the response. Additionally, the universal access control device may retrieve a credential stored in memory and may provide that credential to an access control system as described elsewhere in this specification.

Although the data flow depicted in FIG. 7 involves an access token generated on the user device 204, in some embodiments, the access token may instead be generated by the remote server 302. For example, the user device 204 may submit a request for, and subsequently receive, an access token from the remote server 302. It should also be noted that in some embodiments, alternative methods may be used by the system to validate access information. For example, the remote server 302 may provide the user device 204 with a hash function instead of a public key. In this example, the user device may generate an access token by hashing the nonce and the user ID using the hash function provided. To validate the access token in this example, the universal access control device may convey the nonce value to the remote server 302 and the remote server 302 may independently generate a second hash value, which is then compared to the received access token.

Figure 8:
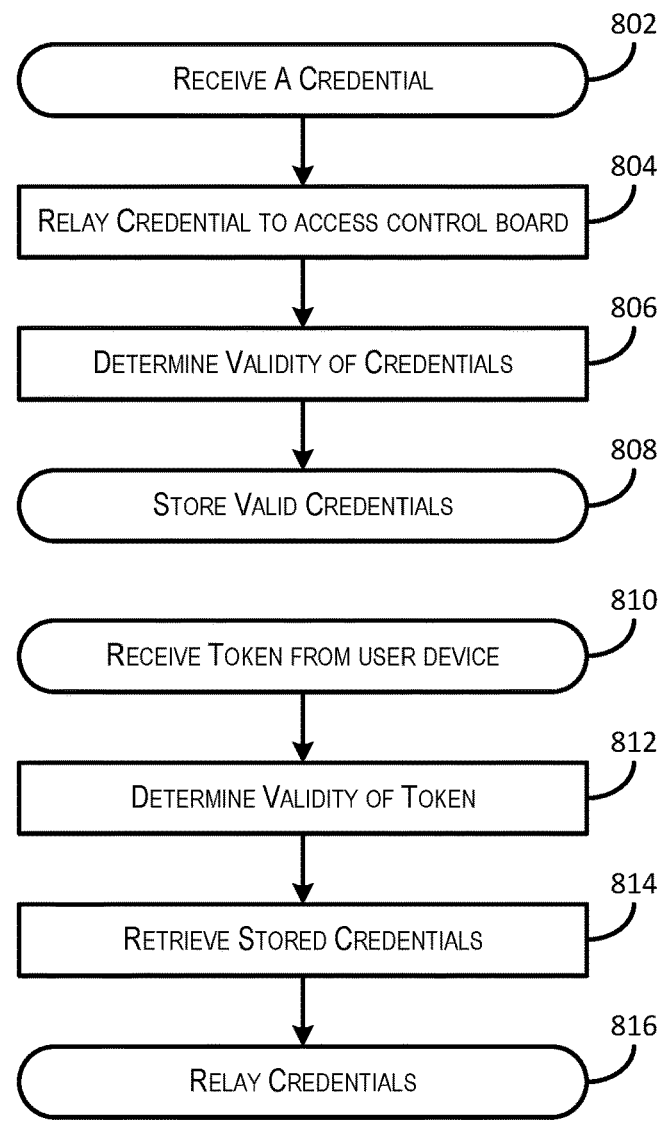
FIG. 8 depicts an illustrative flow chart demonstrating an example interaction between a universal access control device and an access control system in accordance with at least some embodiments.

FIG. 8 depicts an illustrative flow chart demonstrating an example interaction between a universal access control device and an access control system in accordance with at least some embodiments. The process 800 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 800 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 800 of FIG. 8 may be performed by at least the one or more universal access control devices 206 shown in FIG. 2. The code may be stored on a computer-readable storage medium, for example, in the form of a computer program including a plurality of instructions executable by one or more processors. The computer-readable storage medium may be non-transitory.

Process 800 may begin at 802, when a credential is received by a universal access control device (e.g., from a reader device of an access control system). The universal access control device may store an indication of the credential and subsequently relay that credential to an access control board of the access control system at 804. The access control board may then determine whether the credential is valid or not. If the access control board determines that the credential is valid, then it may send a signal back to the universal access control device that indicates the validity of the credential. Upon receiving that indication of validity at 806, the universal access control device is configured to store the credential in memory at 808. For example, the universal access control device may overwrite a credential currently stored in memory with the newly-received credential.

At 810, the universal access control device may receive an access token from a user device. The access token may be received from a mobile application installed on the user device. The access token may be received via a wireless communication mechanism. For example, a mobile application may be executed on the user device which causes the user device to transmit the access token to the universal access control device via a wireless (e.g., Bluetooth®) transmitter.

At 812, the universal access control device may determine the validity of the access token. In some embodiments, the universal access control device may send the received access token to a remote server to verify its authenticity. The universal access control device may also send an identifier associated with the user device from which the access token was received. In some embodiments, the remote server may provide a list of authorized access tokens to the universal access control device to be stored in memory of the universal access control device.

At 814, the universal access control device may retrieve a credential stored in its memory. In some embodiments, the credential may be a preprogrammed credential used for each access request received by the universal access control device. In some embodiments, the credential may be the last valid credential presented to the access control board of the access control system. Once retrieved, the credential may be relayed to the access control board at 816.

Figure 9:
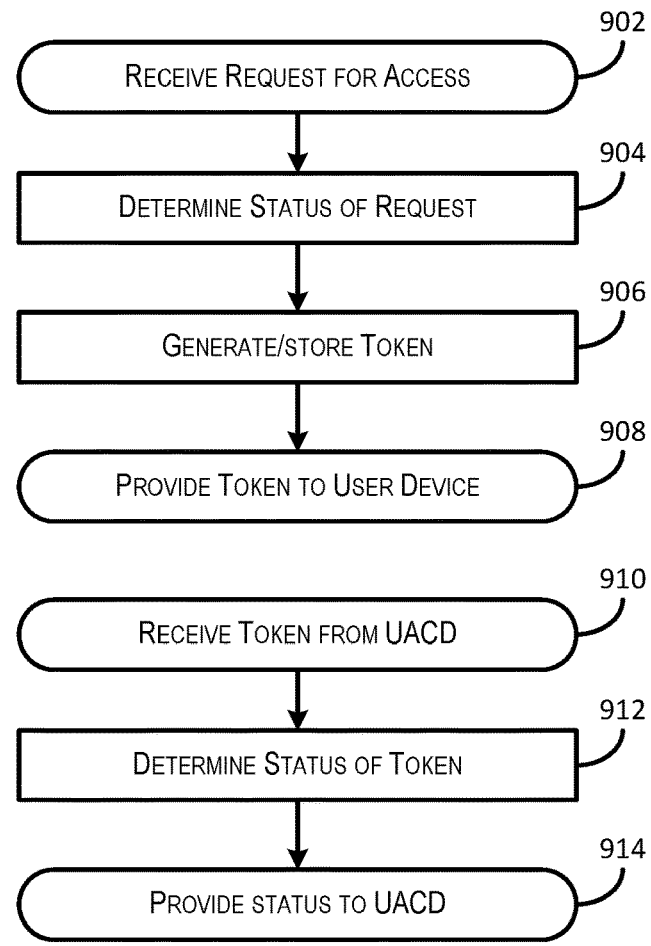
FIG. 9 depicts an illustrative flow chart demonstrating an example interaction between a remote server and a universal access control device in accordance with at least some embodiments.

FIG. 9 depicts an illustrative flow chart demonstrating an example interaction between a remote server and a universal access control device in accordance with at least some embodiments. In accordance with at least one embodiment, the process 900 of FIG. 9 may be performed by at least the one or more remote servers 302 shown in FIG. 3. It should be noted that a remote server may refer to a number of servers working in parallel. For example, a remote server may be a distributed computing system.

Process 900 may begin at 902, when a request is received to access a secure area. In this process, a universal access control device may be identified by the remote server with respect to the received request. For example, the user may submit a request to access a particular property. In this example, the remote server may identify a universal access control device installed in conjunction with a locking mechanism securing the property.

At 904, the remote server may determine a status of the request. For example, the remote server may contact an owner of the secure area associated with the request. If the secure area is controlled by multiple parties, then the remote server may contact a party for which the request is most relevant. For example, if a delivery is to be made to an apartment owner in a secured apartment building, then the remote server may contact either the party to which the delivery is to be made or a manager of the apartment building.

Once the remote server determines that the user's request should be granted, the remote server may generate and store an access token at 906. In some embodiments, the access token may be stored in relation to one or more use conditions. For example, the access token may be valid for a specified period of time. In another example, the access token may be a one-time use token. For example, if a delivery person needs to access a secure area to deliver a package, he or she may be granted an access token that allows the delivery person to gain entry to the secure area only one time.

At 908, the access token may be transmitted to a user device associated with the requesting user. For example, the user may provide his or her mobile phone number when submitting the request for access. Upon generation of the access token, the remote server may transmit the access token to the user's mobile device. In some embodiments, the access token may be pushed to the user device via a push notification. The access token may be provided to an application installed on the user device which is capable of communicating with a universal access control device.

At 910, the remote server may receive the generated access token from a universal access control device. For example, the user may have presented the access token to the universal access control device in order to gain entry to the secure area. The universal access control device may then relay the access token to the remote server (e.g., via an application programming interface (API)).

At 912, the remote server may determine a status of the access token. Upon receiving the access token, the remote server may compare that received token to those in a token vault. If the remote server identifies a match, then the remote server may validate that any related use cases are met (e.g., the access token is unexpired, within the correct time period, etc.). Additionally, the remote server may ensure that the access token is associated with the same universal access control device from which it was received. Upon meeting each of those conditions, the remote server may determine that the access token is valid. Otherwise, the remote server may determine that the access token is invalid. In some embodiments, an identifier associated with the user's user device may also be received with the access token. The remote server may reject the access token as being invalid if the identifier does not match the user device on record (e.g., the one to which the access token was provided). At 914, the remote server may respond to the universal access control device with a status of the access token. For example, the remote server may respond with whether the access token is valid or invalid.

Embodiments of the disclosure provide a number of advantages over conventional systems. For example, the universal access control device described enables owners of secure areas to dynamically create access rights for individuals to access those secure areas without creating new access devices (e.g., badges) for those users. Additionally, it allows owners of a property an enormous amount of flexibility in controlling access rights to their property remotely.

Furthermore, the universal access control device described herein is compatible with nearly any access control system on the market, allowing current owners of access control systems to gain the functionality described herein with minimal architectural changes.

Figure 10:
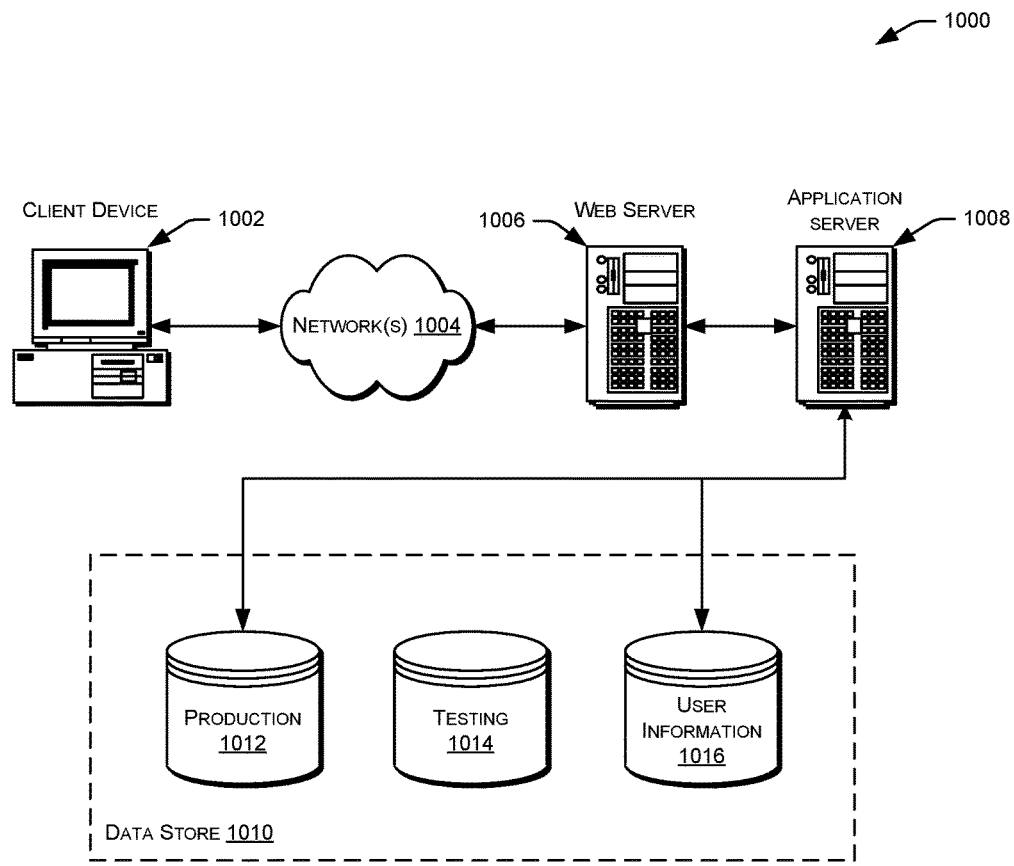
FIG. 10 illustrates an environment in which various embodiments can be implemented.

FIG. 10 illustrates aspects of an example environment 1000 for implementing aspects in accordance with various embodiments. The example environment 1000 may represent aspects of a remote server as depicted in FIG. 3. As will be appreciated, although a Web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A universal access control device, comprising:
    a wireless receiver;
    a processor; and
    a memory including instructions that, when executed with the processor, cause the universal access control device to, at least:
        receive, from a reader device of an access control system that manages access to a physical secure area in communication with the wireless receiver, a credential for use with the access control system;
        forward the credential to an access control board of the access control system;
        upon receiving an indication from the access control board that the credential is valid, store the credential for use by the universal access control device, wherein the credential is overwritten when a new credential is received and an indication is received that the new credential is valid;
        receive, from a user device via the wireless receiver, an access token to be used in accessing the physical secure area managed by the access control system, wherein the access token is different from the credential;
        determine, by communicating the access token to a remote server separate from the access control board, a validity of the received access token; and
        upon determining that the received access token is valid, relay the credential to an access control board of the access control system to cause it to enable access to the secure area.

2. The universal access control device of claim 1, wherein the universal access control device includes a splitter device installed between a reader device and the access control board of the access control system.

3. The universal access control device of claim 2, wherein the splitter device of the universal access control device is connected to the reader device and the access control board via Wiegand interface connections.

4. The universal access control device of claim 2, wherein the credential for use with the access control system is received from the reader device upon presentation of an access device to the reader device by a second user.

5. A computer-implemented method, comprising:
    receiving, by a universal access control device from a reader device of an access control system, a credential for use with the access control system;
    forwarding the credential to an access control board of the access control system;
    upon receiving an indication from the access control board that the credential is valid, storing, by the universal access control device, the credential for use with the access control system;
    receiving, from a user device via a wireless receiver of the universal access control device, an access token different from the credential;
    validating the access token based at least in part on information received from a service provider server which is remote from the universal access control device; and
    upon determining that the access token is valid, transmitting, by the universal access control device, the stored credential to the access control system to cause it to grant access.

6. The computer-implemented method of claim 5, wherein the wireless receiver is a wireless receiver in accordance with the Bluetooth® series of wireless communication standards.

7. The computer-implemented method of claim 5, wherein storing the credential for use with the access control system further comprises:
    receiving a new credential from a reader device of the access control system;
    overwriting the credential with the new credential; and
    forwarding the credential to an access control board of the access control system.

8. The computer-implemented method of claim 5, wherein transmitting the stored credential to the access control system comprises relaying the stored credential over a direct physical connection to an access control board of the access control system.

9. The computer-implemented method of claim 5, wherein transmitting the stored credential to the access control system comprises wirelessly transmitting the credential to a reader device of the access control system.

10. The computer-implemented method of claim 5, wherein the user device is a mobile phone.

11. The computer-implemented method of claim 10, wherein the access token is received from a mobile application installed on the mobile phone.

12. The computer-implemented method of claim 5, wherein the access token is associated with one or more use conditions.

13. A method of enabling access to a secure area, comprising:
    receiving a credential for use with an access control system from a reader device of the access control system;
    forwarding the credential to an access control board of the access control system;
    upon receiving an indication from the access control board that the credential is valid, storing the credential as a valid credential;
    receiving, from a user device via the wireless receiver, an access token to be used in accessing a secure area managed by the access control system;
    determining, by communicating the access token to a remote server, a validity of the received access token; and
    upon determining that the received access token is valid, relaying the valid credential to an access control board of the access control system to cause it to enable access to the secure area.

14. The method of claim 13, wherein the indication that the credential is valid is received upon determining that the credential received from the reader device via a separate access request is valid.

15. The method of claim 14, wherein the credential received from the reader device is determined to be valid upon detecting that the separate access request resulted in enabling access to the secure area.

16. The method of claim 14, wherein the reader device is a card reader operating on Radio-Frequency Identification.

* * * * *